United States Patent [19]
Van Ert

[11] Patent Number: 5,462,786
[45] Date of Patent: Oct. 31, 1995

[54] DECORATIVE PANELS FOR AUTOMOBILE INTERIORS

[75] Inventor: Jack Van Ert, Sheboygan, Wis.

[73] Assignee: ASAA Technologies, Inc., Sheboygan, Wis.

[21] Appl. No.: 212,399

[22] Filed: Mar. 10, 1994

Related U.S. Application Data

[60] Continuation of Ser. No. 818,685, Jan. 7, 1992, abandoned, which is a division of Ser. No. 673,539, Mar. 22, 1991, abandoned.

[51] Int. Cl.$^6$ .................................................. B32B 5/14
[52] U.S. Cl. ................. 428/171; 428/95; 428/88; 428/53; 428/172; 156/580; 156/212; 156/245; 156/228
[58] Field of Search ................. 428/411.1, 171, 428/172, 48, 53, 88, 95; 156/580, 212, 245, 228; 264/249, 243, 259, 257, 163; 425/408, 412

[56] References Cited

U.S. PATENT DOCUMENTS

| | | | |
|---|---|---|---|
| 3,058,154 | 10/1962 | Howard et al. | 156/224 |
| 4,307,058 | 12/1981 | Morello et al. | 264/510 |
| 4,622,191 | 11/1986 | Takeuchi | 264/134 |
| 4,722,760 | 2/1988 | Shimada et al. | 156/219 |
| 4,779,390 | 10/1988 | Repper et al. | 52/222 |
| 4,781,956 | 11/1988 | Zimmermann et al. | 428/43 |
| 4,802,948 | 2/1989 | Zimmerman | 156/500 |
| 4,810,452 | 3/1989 | Taillefert et al. | 264/247 |
| 4,830,929 | 5/1989 | Ikeda et al. | 428/542.8 |
| 4,873,045 | 10/1989 | Fujita et al. | 264/259 |
| 4,923,539 | 5/1990 | Spengler | 156/79 |
| 4,978,407 | 12/1990 | Ardissone | 156/216 |

FOREIGN PATENT DOCUMENTS

| | | |
|---|---|---|
| 0639500 | 4/1962 | Canada . |
| 0221737 | 12/1983 | Japan . |

*Primary Examiner*—Patrick J. Ryan
*Assistant Examiner*—Merrill Dixon
*Attorney, Agent, or Firm*—Foley & Lardner

[57] ABSTRACT

Decorative panel for automobile interiors including method and apparatus of a compression press, and a groove in stationary platen die and a movable platen die with a metal blade edging mounted therein, and the blade edging having a perimeter matching the outer wall of the groove in the stationary platen die section, and the contour of the movable platen die to match the contour of the stationary die and a formed decorative panel with down turned edges of the same perimeter as the groove imbedded in mounting panel stock on closing of the compression press.

11 Claims, 3 Drawing Sheets

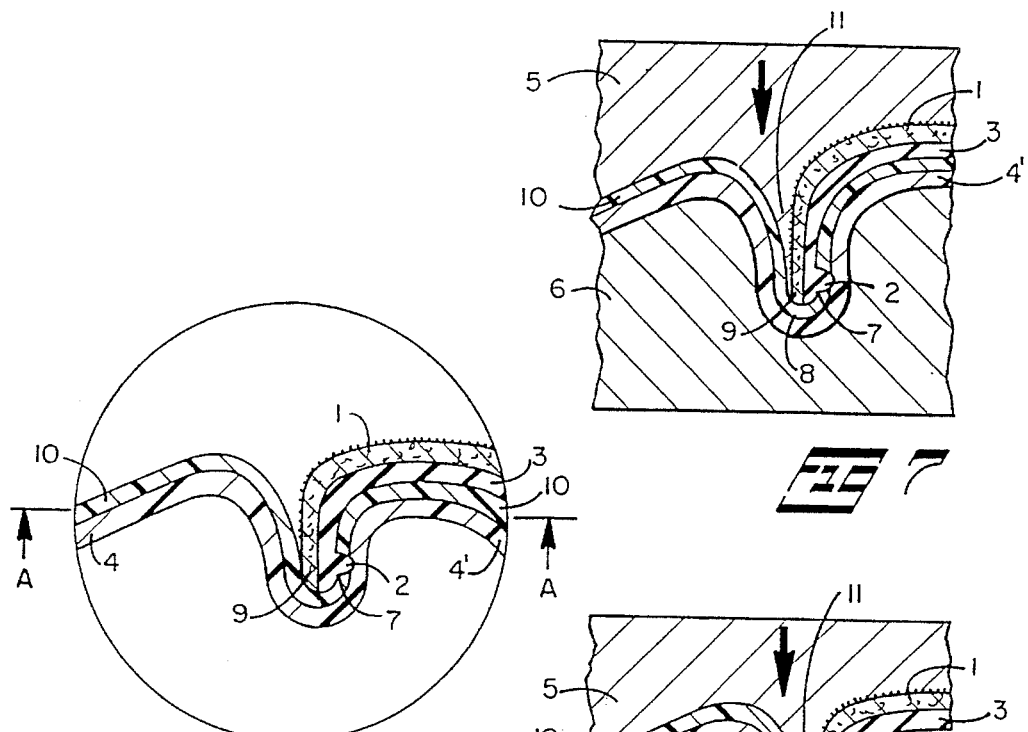
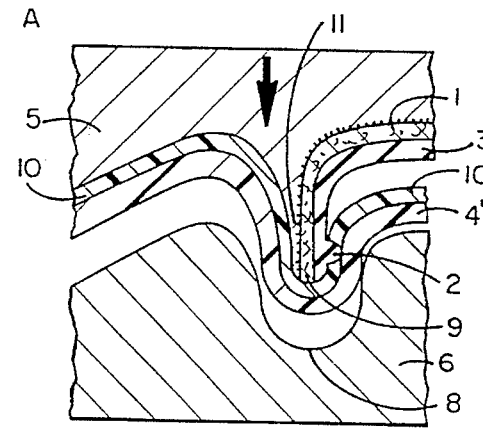
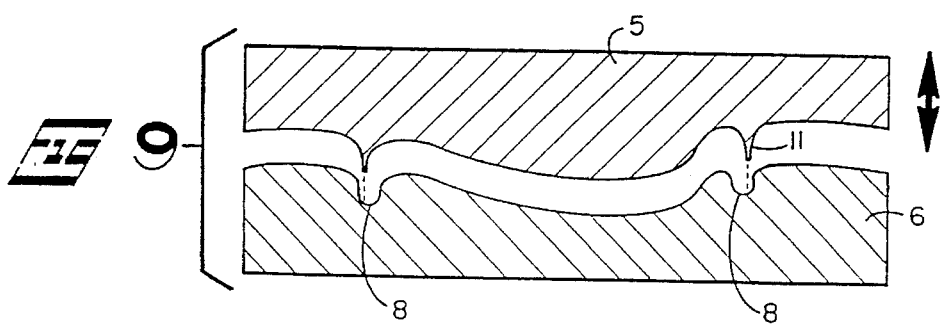

5,462,786

DECORATIVE PANELS FOR AUTOMOBILE INTERIORS

This is a continuation of application Ser. No. 07/818,685 filed Jan. 7, 1992 abandoned, which is a division of 07/673,539, filed Mar. 22, 1991, now abandoned.

SUMMARY OF TECHNICAL FIELD:

The disclosure herein relates to decorative panels for automobiles, aircraft and similar interiors, wherein one or more decorated formed panels are joined to a larger panel. For example automobile interior door panels are usually decorated in various ways, including decorative panels, and such panels may be of a sheet of formed plastic or sheet metal, over which may be applied a decorative portion by means of adhesive and possibly a molding strip.

Disclosure Is made herein of a unique apparatus and method of joining a decorative panel to a mounting panel, and the product derived there from.

BACKGROUND OF THIS INVENTION

Decorative panels have been in use for a long time, particularly in automobiles, for sound and weather proofing.

Prior art patents pertaining to this subject are;

U.S. Pat. No. 4,779,390, For "Lining For The Interior Of An Automotive Vehicle". This patent discloses a foundation panel partitioned late at least two contiguous surface areas, by a groove and webs of material laminated on the foundation areas and a seam Is provided between them and tucking portions of the web into the groove and the web is superposed on an adhesive coating.

U.S. Pat. No. 4,781,956, for "Interior Trim component For A Motor Vehicle". Disclosure is made In this patent of a fibrous mat attached to .the panel, with various amounts of compression on various areas of the mat.

U.S. Pat. No. 4,873,045 for "Method For Manufacturing Automotive Interior Components". Disclosure is made in this patent of a urethane foam, Cold pressed on a semi molten thermoplastic resin material.

Other U.S. patents for the record are:
U.S. Pat. Nos. 4,802,948
4,810,452
4,923,542; 4,923,539
Canadian Patent No. 639,500.
Japanese Patent No. 0221737 Issued Dec. 23, 1983.

OBJECTS OF THIS INVENTION

An object of this invention is to disclose as a manufacture a decorated panel having an overlaid decorative segment attached to the panel by means of protrusions on the inner edges of the decorative segment and the edges of the decorative segment imbedded into a groove of a mounting panel.

Another object is to disclose apparatus for attaching a decorative assembly to a mounting panel stock by means of a press to force turned down edges of a decorative assembly into a heat softened mounting panel stock and forcing the turned down edge of the decorative assembly into the mounting panel stock, comprising a stationary female die section, having therein a groove of the same perimeter as the turned down edges of the decorative assembly, and the heat softened mounting panel stock laid on the female die section, and the decorative assembly panel at ambient temperature, having the turned down edges facing the heat softened mounting panel stock with the turned down edges aligned with the groove in the female die section and a male die section mounted on the movable platen, and metal blade edging mounted in the movable platen male die section, which edging is of the same perimeter as the outer edge of the groove in the stationary platen female die section and the blade edging acts in concert with the turned down edge of the decorative panel and metal blade edging mounted in the movable male die section which edging is of the same perimeter as the outer edge of the groove in the stationary or female die, and the blade edging acts in concert with the turned down edge of the decorative panel, and closing the die in the press the turned down edges of the decorative assembly are imbedded into the heat softened mounting panel stock forced into the groove in the female die section.

Another object is to disclose protrusions on the inner surface of the turned down edges of the decorative assembly, and the protrusions imbed, or are coined into the groove wall of the mounting panel stock.

Another object is to disclose a decorated panel wherein a decorative assembly is attached to a thermoplastic mounting panel stock by imbedding turned down edges of a decorative assembly in a groove in the mounting panel stock, and protrusions in the back of the turned down edges of the decorative assembly coin into the wall of the groove of the mounting panel stock.

BRIEF DESCRIPTION OF DRAWINGS

FIG. 6 - Magnified cross section view of fitting of decorative insert in groove of formed mounting panel stock FIG. 7 - Magnified cross section view of fitting of decorative insert in groove of formed mounting panel stock in closed die.

FIG. 8 - Magnified cross section view of formed decorative insert edge and partially formed groove of mounting panel stock.

FIG. 9 - Cross section view of forming dies.

DETAILED DESCRIPTION OF DRAWINGS

Figure 1:
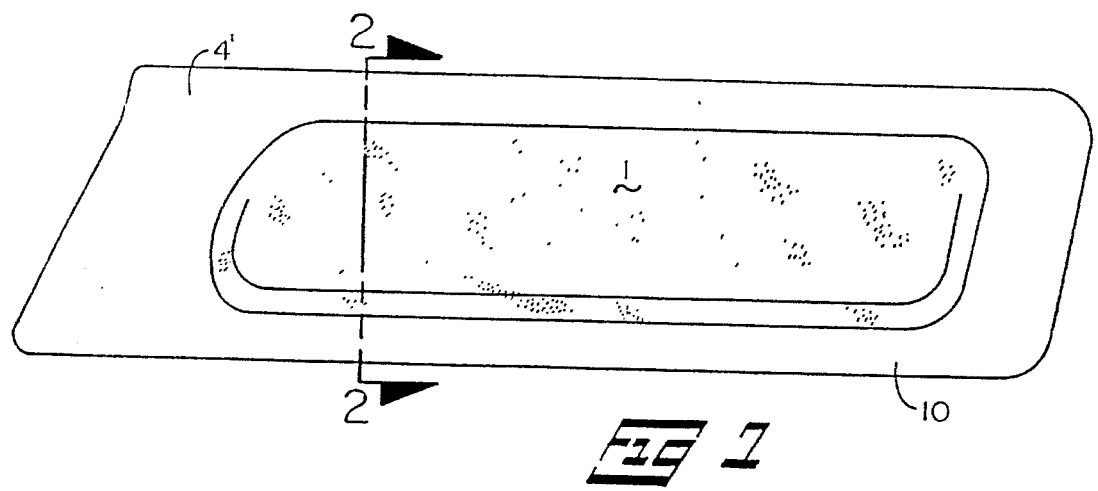
FIG. 1 - Face elevation view of assembled panel.

FIG. 1 - Face elevation view of assembled panel;
1 - Decorative surface of insert.
4'- Formed mounting panel stock.
10 - Decorative overlay sheet.

Figure 2:
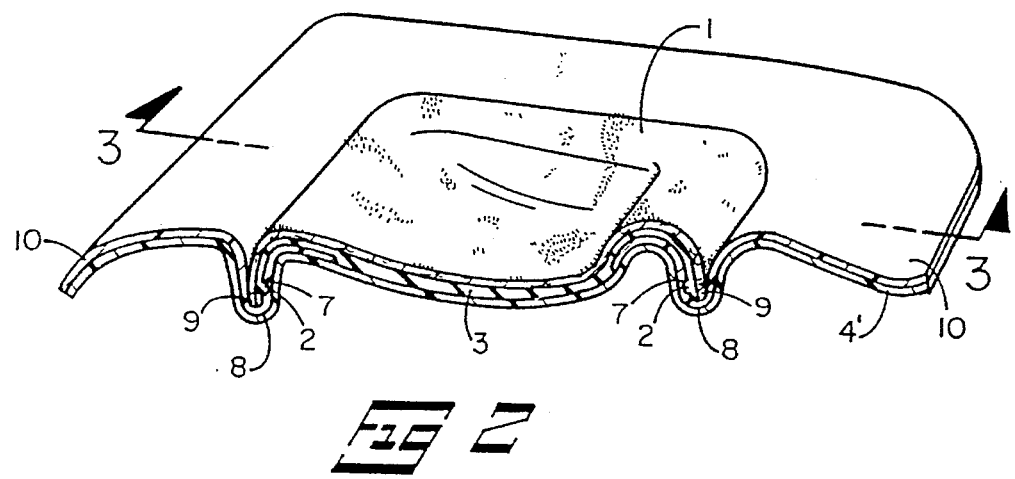
FIG. 2 - Cross section perspective view of assembled panel.

FIG. 2 - Cross section perspective view of assembled panel;
1 - Decorative surface of insert.
2 - Protrusion on back edge of backing of decorative insert.
3 - Backing of formed decorative insert.
4'- Formed mounting panel stock.
7 - Dimple from protrusion on back edge of insert.
8 - Groove.
9 - Downturned edge of decorated panel
10 - Decorative overlay sheet.

Figure 3:
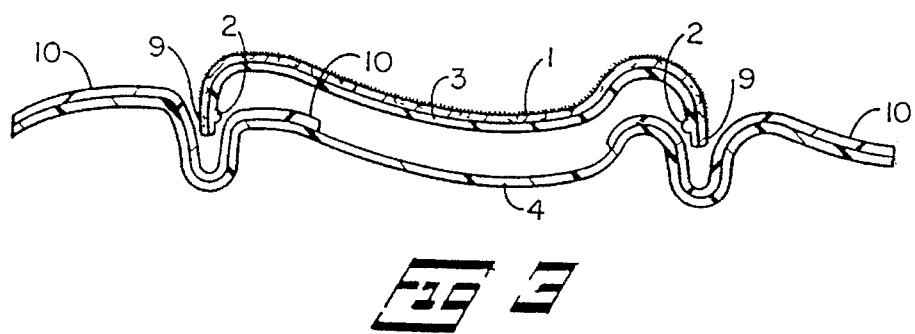
FIG. 3 - Exploded cross section view of decorative insert to fit into mounting panel.

FIG. 3 - Exploded cross section view or decorative insert to fit into mounting panel;

1 - Decorative surface of insert.
2 - Protrusion on back edge of backing of decorative insert.
3 - Backing of formed decorative insert.
4'- Formed mounting panel stock.
9 - Downturned edge of decorated panel.
10 - Decorative overlay sheet.

Figure 4:
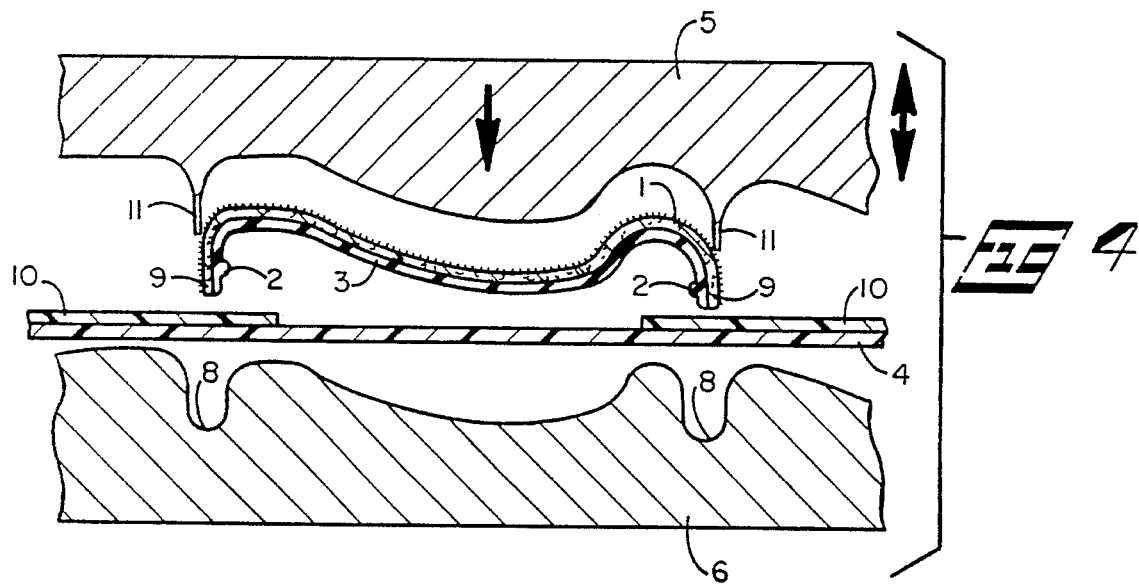
FIG. 4 - Cross section view of forming die and decorative panel before closing of forming die.

FIG. 4 - Cross section view of forming die and decorative panel before closing of forming die.
1 - Decorative surface of insert.
2 - Protrusion on back edge of backing of decorative insert.
3 - Backing of formed decorative insert.
4 - Mounting panel stock.
5 - Movable die section.
6 - Stationary die section.
8 - Groove.
9 - Downturned edges of decorative panel.
10 - Decorative overlay sheet.
11 - Metal blade edging.

Figure 5:
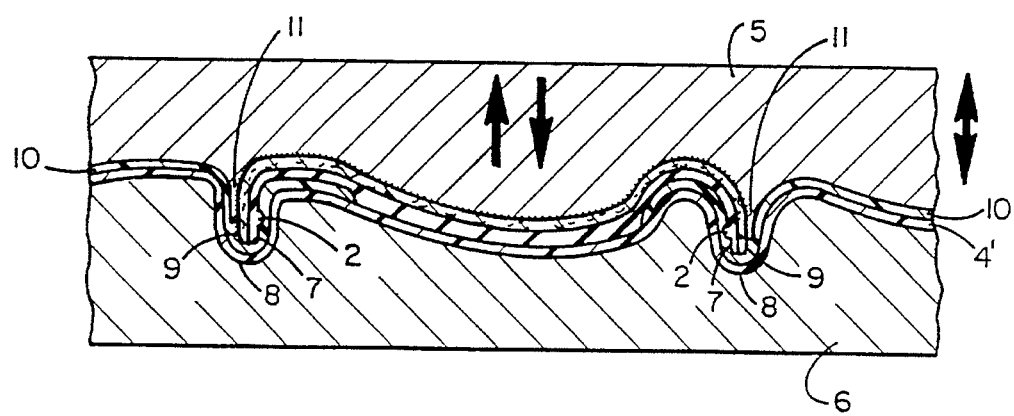
FIG. 5 - Cross section view of forming die in closed position, with completed formed decorative panel.

FIG. 5 - Cross section view of forming die in closed position, with completed formed decorative panel.
1 - Decorative surface of insert.
2 - Protrusion on back edge of backing of decorative insert.
3 - Backing of formed decorative insert.
4'- Formed mounting panel stock.
5 - Movable die section.
6 - Stationary die section.
7 - Dimple from protrusion on back edge of insert.
8 - Groove.
9 - Downturned edges of decorative panel.
10 - Decorative overlay sheet.
11 - Metal blade edging.

FIG. 6 Magnified cross section view of fitting of decorative insert in groove of formed mounting panel stock.
1 - Decorative surface of insert.
2 - Protrusion on back edge of backing of decorative insert.
3 - Backing or formed decorative insert.
4'- Formed mounting panel stock.
7 - Dimple from protrusion on back edge of insert.
9 - Downturned edge of decorated panel.
10 - Decorative overlay sheet.

FIG. 7 - Magnified cross section view of fitting of decorative insert in groove of formed mounting panel stock in closed die.
1 - Decorative surface of insert.
2 - Protrusion on back edge of backing of decorative insert.
3 - Backing of formed decorative insert.
4'- Formed mounting panel stock.
5 - Movable platen die section.
6 - Stationary platen die section.
7 - Dimple from protrusion on back edge of insert.
8 - Groove.
9 - Downturned edge of decorated panel.
10 - Decorative overlay sheet.
11 - Metal blade edging.

FIG. 8 - Magnified cross section view of formed decorative insert edge and partially formed groove of mounting panel stock.
1 - Decorative surface of insert.
2 - Protrusion on back edge of backing of decorative insert.
3 - Backing of formed decorative insert.
4"- Partially formed mounting panel stock.
6 - Stationary platen die section.
7 - Dimple from protrusion on back edge of insert.
8 - Groove.
9 - Downturned edge of decorated panel.
10 - Decorative overlay sheet.
11 - Metal blade edging.

FIG. 9 - Cross section view of forming die.
5 - Movable platen die section.
6 - Stationary platen die section.
8 - Groove.
11 - Metal blade edging.

IDENTIFICATION OF TERMS

The words "edge" and "edges", are used interchangably.

"Platen die sections", includes a die mounted on a platen, and to mention the "die", this includes "mounting on the platen".

"Metal blade edging", is to identify a metal strip mounted edgewise on the die section.

"Imbed" is a var. of "embed".

"Downturned edge" is used interchangably with "turned down edge", and "downward turned edges".

DESCRIPTION OF PREFERRED EMBODIMENT OF THIS INVENTION

Decorated panels for automobile interiors now usually include a decorative segment attached to a mounting panel.

An elevation side view of a decorated panel is shown in FIG. 1, wherein the decorated segment 1, is attached to a mounting panel 4.

The disclosure of apparatus, method and product which follows, includes a movable platen die section 5, and stationary platen die section 6, which die sections are mounted in a conventional compression press. No further description will be made of the compression press as such is well known.

In the following discussion the assembly of decorative surface of insert 1, and backing of formed decorative insert 3, are collectively called the decorative assembly.

To further describe this invention, it is to be pointed out that the backing of formed decorative insert 3, and mounting panel stock 4, are made of sheet stock of a thermoplastic, such as a polyolefin, preferably polypropylene with fiber reinforcement such as wood fibers glass fibers, or plastic fibers. Such fiber reinforced material may have:

Density range 0.95–1.05

Hardness (ASTM 02240) 82 (Shore A)

Mod. of elasticity (ASTM 0638-80) 0.3 G.Pa.

As a further example the backing and panel stock may have a thickness of approximately 0.125 inches, more or less.

FIG. 1 shows a side elevation view of complete decorated interior panel, while FIG. 2, is a cross section view of such decorated panel of this invention, showing in particular the decorative surface of insert 1 and its backing 3.

Metal blade edging 11, is mounted in movable platen die section 5, to assist in forcing the downturned edges 9 of the decorative panel, as shown in FIG. 9. FIGS. 4, 5, 7 and 8 show the entry of the components into groove 8.

The decorative surface 1, is attached to the backing, and this assembly of 1 and 3 is heat formed to include downturned edges 9, on the outer periphery of this decorative assembly.

The assembly of decoration surface of insert 1 and the backing of formed decorative insert 3 is of such form that includes downturned edges 9, of the decorative assembly. This decorative assembly surface 1 is usually a type of woven or non-woven fabric, and is attached to the backing 3, by means of hot pressing, or hot melt adhesive. The backing 3, of formed decorative insert can be fiber filled thermoplastic such as polypropylene, as described above, and as such is a conventional material.

The above decorative assembly is formed to any desired surface shape plus downturned edges 9, and may include protrusions 2, on the back edge of downturned edge 9, by heating to flexibility and forming in a die and press. This formed assembly is the decorative assembly panel for subsequent attachment of the assembly on mounting panel stock 4, which is the disclosure of this invention.

Mounting panel stock 4, is of thermoplastic polyolefin, such as polypropylene, filled with various fibers, as described above.

The decorative assembly formed with downturned edges 9, at ambient or room temperature is quite rigid as indicated by the above data, and is attached to mounting panel stock 4, as described below.

Mounting panel stock 4, is heated to softening at about 330° to 350° F., and while hot is laid on a stationary female die section 6, having groove 8 on the mating surface, and the decorative assembly of backing 3 and decorative surface 1, is placed on the heated panel stock. 4, with the downturned edges 9, matching the groove 8, and movable die section 5, having a shape conforming to the decorative assembly, is forced by action of the press in which the die sections are mounted so that the downturned edges 9, of the decorated assembly, acting in concert with metal blade edging 11, are imbedded, or coined into the mounting panel stock 4 in groove 8 and protrusions 2, on back edge of downturned edge 9 coin into side wall of groove of mounting panel stock 4. On cooling of mounting panel stock 4 with decorative assembly attached thereto, the decorative assembly is rigidly attached to the mounting panel stock.

Referring now to FIG. 4, this illustrates mounting panel stock 4 between the die sections 5 and 6, and FIG. 5 illustrates the formed panel stock 4' with the downturned edge 9 of decorative assembly of 1 and 3 coined into the mounting panel stock 4.

FIG. 8 illustrates a magnified cross section view partially formed mounting panel stock 4", just prior to full close of the die sections.

FIG. 7 illustrates the coining of time decorative assembly into the formed mounting panel stock in groove 8, and the coining of protrusion 2 into mounting panel stock wall 7, and metal blade edging 11, in groove 8.

Protrusion 2 on back edge of backing of decorative insert, are located on the underside of downturned edges 9 of the decorative assembly.

To insure proper and tight fit of the decorative assembly the groove 8 should be of such width to cause a tight or interference fit of the downturned edges of the decorative panel 9 into the mounting panel stock 4, and time final imbedment of decorative assembly edge 9 into the mounting panel stock 4 is as shown in FIG. 7, with the protrusions 2 on back edge of downturned edge 9 of decorated assembly coined into the groove wall of mounting panel stock 4, when platen dies 5 and 6 are forced together, with the dies at ambient or controlled temperature to solidify the heat softened mounting panel stock 4 with the decorated assembly imbedded therein.

The decorative overlay sheet 10, if desired can be a thermoplastic such as polyvinyl and heat sealed to the mounting panel stock 4. The decorative overlay sheet 10, extends inward beyond groove 8, as shown in FIG. 4, and as noted in FIGS. 6, 7, and 8 the decorative sheet 10, extends inward beyond the edge of groove 8, and is crimped into the groove 8, along with downturned edge of decorative panel 9 or the decorative assembly.

In the method above described, the contour of the completed decorated panel is controlled by the compression die configuration on platens 5 and 6.

The decorative overlay sheet 10 may be applied to the top surface of mounting panel stock 4, prior to placing of this mounting panel stock in the die for mounting of the decorative assembly.

The above mentioned decorative overlay sheet 10 may be a polyolefin or polyvinyl sheet, and attached to mounting panel stock 4 by hot pressing or hot melt adhesive.

Referring now to FIG. 9, which shows the platen die sections 5 and 6, in "open" press position to show the metal blade edging 11, which is rigidly mounted in the platen die, and as shown in FIG. 9, is mounted in the movable platen die 5. The metal blade edging 11, is of such perimeter or contour to match the perimeter of tile outer edge of groove 8, in the stationary platen die 6.

The purpose of the metal blade edging 11, is to act in concert along with downturned edge of decorative panel 9, to force the mounting panel stock 4, and downturned edges of decorative panel 9 into groove 8.

The thickness of the metal blade edging is about 0.040 to 0.060 inches.

The mounting panel stock 4, is heated to "soft" flexibility at about 330° to 350° F., to attain suitable forming in the groove 8.

The temperature of platen dies 5 and 6, are controlled in a conventional manner by suitable cooling coils as required.

The metal blade edging 11 is shown in FIGS. 4, 5, 7, 8 and 9 and its relation to the forming function for the decorated mounting panel stock 4.

Having described my invention I claim:

1. A contoured decorated panel, comprising:

a mounting panel comprising a thermoplastic material and having a groove therein; and a decorative insert comprising a decorative surface, a thermoplastic backing laminated onto the decorative surface, and an edge which is disposed in the groove in the mounting panel, the edge having a lateral protrusion which is embedded into a wall of the groove of the mounting panel in a manner effective to hinder removal of the edge from the groove.

2. The decorative panel of claim 1, wherein the protrusion is formed on a rear surface of the backing and extends into the mounting panel at an inner wall of the groove.

3. A contoured decorated panel, comprising:

a mounting panel comprising a thermoplastic material and having a groove therein; and a decorative insert comprising a decorative surface, a thermoplastic backing laminated onto the decorative surface, and an edge which is disposed in the groove in the mounting panel, the edge having a lateral protrusion which is embedded into a wall of the groove of the mounting panel in a manner effective to hinder removal of the edge from the groove, which protrusion is formed on a rear surface of the backing and extends into the mounting panel at an inner wall of the groove, wherein front, rear and end surfaces of the edge of the insert are in contact with and covered by the mounting panel.

4. The decorative panel of claim 3, wherein the insert edge extends around the entire periphery of the insert, and the groove in the mounting panel is an endless groove matching the peripheral shape of the insert.

5. The decorative panel of claim 1, wherein the insert edge extends around the entire periphery of the insert, and the groove in the mounting panel is an endless groove matching the peripheral shape of the insert.

6. The decorative panel of claim 1, wherein the decorative surface a fabric.

7. The decorative panel of claim 1, wherein the decorative material comprises fiber-filled polypropylene.

8. The decorative panel of claim 7, wherein the mounting panel comprises fiber-filled polypropylene.

9. The decorative panel of claim 8, wherein the decorative surface is a fabric.

10. The decorative panel of claim 1, wherein the mounting panel further comprises an outer decorative thermoplastic overlay sheet which covers the mounting panel outwardly from the insert and contacts the edge of the insert in the groove, the mounting panel being free of the overlay sheet at a portion thereof underlying the insert.

11. The decorative panel of claim 2, wherein a number of the protrusions along the edge of the insert are coined into the inner wall of the groove in the mounting panel.

* * * * *